US008891017B2

(12) United States Patent
Kegasawa (10) Patent No.: US 8,891,017 B2
(45) Date of Patent: Nov. 18, 2014

(54) VIDEO PROCESSING APPARATUS, DISPLAY APPARATUS, AND VIDEO PROCESSING METHOD

(71) Applicant: Seiko Epson Corporation, Tokyo (JP)

(72) Inventor: Kazuyoshi Kegasawa, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/136,194

(22) Filed: Dec. 20, 2013

(65) Prior Publication Data

US 2014/0198255 A1 Jul. 17, 2014

(30) Foreign Application Priority Data

Jan. 11, 2013 (JP) .................................. 2013-003254

(51) Int. Cl.
H04N 5/14 (2006.01)
H04N 9/64 (2006.01)
H04N 5/91 (2006.01)

(52) U.S. Cl.
CPC ....................................... *H04N 5/91* (2013.01)
USPC ........... 348/571; 348/500; 348/504; 348/523; 348/524; 348/525; 348/555; 348/556; 348/563; 348/564; 348/565; 348/567; 348/569; 348/575; 348/584; 348/598; 348/665; 348/705; 348/706; 348/719; 348/725; 348/441; 348/443; 348/446; 348/448; 348/454; 348/456; 348/465; 348/495; 348/222.1

(58) Field of Classification Search
USPC ......... 348/571, 500, 504, 523, 524, 555, 556, 348/563, 564, 565, 567, 569, 575, 598, 665, 348/705, 706, 725, 441, 443, 446, 448, 454, 348/456, 464, 495, 525, 584, 719, 465
See application file for complete search history.

(56) References Cited

U.S. PATENT DOCUMENTS

| | | | | |
|---|---|---|---|---|
| 5,574,504 A | * | 11/1996 | Yagasaki et al. | 375/240.13 |
| 6,317,159 B1 | * | 11/2001 | Aoyama | 348/458 |
| 2001/0007562 A1 | * | 7/2001 | Matsuoka et al. | 370/415 |
| 2004/0027486 A1 | * | 2/2004 | Fujiwara et al. | 348/557 |
| 2004/0160530 A1 | * | 8/2004 | Suzuki | 348/536 |
| 2006/0001774 A1 | * | 1/2006 | Kamimura | 348/581 |
| 2006/0005110 A1 | * | 1/2006 | Nango et al. | 714/785 |
| 2006/0056515 A1 | * | 3/2006 | Kato et al. | 375/240.16 |
| 2006/0104369 A1 | * | 5/2006 | Kikuchi et al. | 375/240.28 |
| 2006/0132647 A1 | * | 6/2006 | Hsieh et al. | 348/446 |
| 2007/0188660 A1 | * | 8/2007 | Kai et al. | 348/571 |
| 2007/0223573 A1 | * | 9/2007 | Park et al. | 375/240.1 |
| 2009/0219439 A1 | * | 9/2009 | Sellers et al. | 348/452 |
| 2011/0141372 A1 | * | 6/2011 | Kato et al. | 348/700 |
| 2011/0205441 A1 | * | 8/2011 | Jones et al. | 348/659 |
| 2011/0279655 A1 | * | 11/2011 | Tan | 348/49 |
| 2012/0242797 A1 | * | 9/2012 | Watanabe | 348/46 |
| 2013/0003864 A1 | * | 1/2013 | Sullivan | 375/240.25 |

FOREIGN PATENT DOCUMENTS

JP        A-2007-67499        3/2007

* cited by examiner

*Primary Examiner* — Jefferey Harold
*Assistant Examiner* — Mustafizur Rahman
(74) *Attorney, Agent, or Firm* — Oliff PLC (57) ABSTRACT

A video input section acquires a video signal formed of a plurality of frames. A frame separator separates the video signal acquired by the video input section on a frame basis and distributes the separated video signals. A plurality of parallel processors perform video processing in parallel on the separated video signals corresponding to the frames separated and distributed by the frame separator. A frame combiner combines the separated video signals on which the plurality of parallel processors have performed the video processing.

10 Claims, 7 Drawing Sheets

VIDEO PROCESSING APPARATUS, DISPLAY APPARATUS, AND VIDEO PROCESSING METHOD

The entire disclosure of Japanese Patent Application No. 2013-003254, filed Jan. 11, 2013, is expressly incorporated by reference herein.

BACKGROUND

1. Technical Field

The present invention relates to a video processing apparatus, a display apparatus, and a video processing method.

2. Related Art

An example of a video processing method for processing high-resolution video images having a resolution of 4096× 2160 pixels (hereinafter referred to as 4K2K) or greater includes dividing a single screen into a plurality of screens, processing the divided screens in parallel, and eventually combining the processed screens with each other. A screen of high resolution is thus processed. The technology described in JP-A-2007-67499 includes inputting an image captured with a video camcorder, removing a peripheral image portion of the inputted image to leave a central image portion, dividing the central image portion into four each of which has an overlapping area so that the four divided image portions overlap with each other, storing the four divided image portions, removing the overlapping area from each of the divided four image portions, combining the four image portions with no overlapping areas, and outputting the combined image.

Using the technology described in JP-A-2007-67499, however, has a problem of complicated video processing because when a single screen is divided into a plurality of screens, each of the divided screens has an overlapping area in order to avoid discontinuity in image quality along the boundary between the divided screens, and the overlapping areas therefore need to be removed before combining the divided screens. Further, since the video processing including the process of dividing a single screen into a plurality of screens requires storing the plurality of divided screens in a frame memory, a dedicated frame memory or a high-bandwidth frame memory is required, undesirably resulting in an increase in cost. High-resolution video processing in related art has problems of complicated processing and an increase in cost as described above.

SUMMARY

An advantage of some aspects of the invention is to provide a video processing apparatus, a display apparatus, and a video processing method that allow video processing to be readily performed at low cost.

(1) An aspect of the invention is directed to a video processing apparatus including a video input section that acquires a video signal formed of a plurality of frames, a frame separator that separates the video signal acquired by the video input section on a frame basis and distributes the separated video signals, a plurality of parallel processors that perform video processing in parallel on the separated video signals corresponding to the frames separated and distributed by the frame separator, and a frame combiner that combines the separated video signals on which the plurality of parallel processors have performed the video processing.

According to the thus configured video processing apparatus described above, since the frame separator separates video images inputted to the video input section into a plurality of frames that form the video images, the plurality of parallel processors can perform the video processing on a frame basis. The frame separator therefore needs to use no frame memory for cost reduction. Further, the video processing in the video processing apparatus can be readily performed because the video processing includes no complicated processing.

(2) Another aspect of the invention is directed to the video processing apparatus described above, in which the frame separator subtracts sync signals corresponding to frames that do not undergo the video processing and outputs the resultant video signals to the plurality of parallel processors.

According to the configuration described above, in which sync signals other than those corresponding to frames that undergo the video processing are subtracted, each of the plurality of parallel processors in the video processing apparatus can perform the video processing on target frames, whereby the frame separator only needs to separate video images into a plurality of frames, and the video processing can be readily performed without complicated processing. Further, the frame separator needs no frame memory for cost reduction.

(3) Still another aspect of the invention is directed to the video processing apparatus described above, in which the frame separator subtracts frames that do not undergo the video processing and outputs the resultant video signals to the plurality of parallel processors.

According to the configuration described above, the frame separator in the video processing apparatus subtracts video images other than those in frames on which the plurality of parallel processors perform the video processing to allow the plurality of parallel processors to perform the video processing on target frames, whereby the video processing can be readily performed without complicated processing. Further, the frame separator needs no frame memory for cost reduction.

(4) Yet another aspect of the invention is directed to the video processing apparatus described above, in which the frame separator outputs the video signal to the plurality of parallel processors in a switching operation performed on a frame basis.

According to the configuration described above, the frame separator in the video processing apparatus outputs video images other than those in frames on which the plurality of parallel processors perform the video processing in a switching operation to allow the plurality of parallel processors to perform the video processing on target frames, whereby the video processing can be readily performed without complicated processing. Further, the frame separator needs no frame memory for cost reduction.

(5) Still yet another aspect of the invention is directed to the video processing apparatus described above, in which the video processing includes filtering performed on the video signal and scaling performed on the video signal.

According to the configuration described above, in which the video processing in each of the plurality of parallel processors includes filtering, such as noise removal, and scaling for increasing the resolution of an input signal to produce a high-resolution output signal, the video processing can be readily performed without complicated processing.

(6) Further another aspect of the invention is directed to the video processing apparatus described above, in which each of the plurality of parallel processors performs the video processing on frames that undergo the video processing over a video processing period equal to a frame cycle of the video signal acquired by the video input section multiplied by the number of parallel processors.

According to the configuration described above, when the number of plurality of parallel processors is N, for example, each of the plurality of parallel processors in the video processing apparatus can perform the video processing over a video processing period N times longer than the frame cycle of a plurality of pre-video-processing frames, whereby the video processing can be performed at a high frequency frame rate even when each of the parallel processors has low processing ability.

(7) Still further another aspect of the invention is directed to the video processing apparatus described above, in which the frame combiner combines the video signals on which the plurality of parallel processors have performed the video processing sequentially in the order in which the video signals have been inputted.

According to the configuration described above, the frame combiner in the video processing apparatus combines the plurality of frames having undergone the video processing in the plurality of parallel processors sequentially in the order in which the parallel processors have outputted the frames, whereby the frames can be readily combined with each other without complicated processing.

(8) Yet further another aspect of the invention is directed to the video processing apparatus described above, in which each of the plurality of parallel processors outputs information on a latency in the video processing to the frame combiner, and the frame combiner combines the video signals based on the information on a latency.

According to the configuration described above, even when the plurality of parallel processors have different processing abilities, the frame combiner can correctly combine a plurality of frames, and the video processing apparatus can readily perform the video processing without complicated processing.

(9) Still yet further another aspect of the invention is directed to a display apparatus including a video input section that acquires a video signal, a frame separator that separates the video signal acquired by the video input section on a frame basis and distributes the separated video signals, a plurality of parallel processors that perform video processing in parallel on the separated video signals corresponding to the frames separated and distributed by the frame separator, and a frame combiner that combines the separated video signals on which the plurality of parallel processors have performed the video processing.

According to the thus configured display apparatus including a video processing apparatus described above, since the frame separator separates video images inputted to the video input section into a plurality of frames that form the video images, the plurality of parallel processors can perform the video processing on a frame basis. The frame separator therefore needs to use no frame memory for cost reduction. Further, the video processing in the display apparatus including a video processing apparatus can be readily performed because the video processing includes no complicated processing.

(10) A further aspect of the invention is directed to a video processing method including a first process of causing a video input section to acquire a video signal, a second process of separating the video signal acquired in the first process on a frame basis and distributing the separated video signals, a third process of performing video processing in parallel on the separated video signals corresponding to the frames separated and distributed in the second process, and a fourth process of combining the separated video signals on which the video processing has been performed in the third process.

According to the thus configured video processing method described above, since video images inputted in the video input process are separated in the frame separation process into a plurality of frames that form the video images, the video processing can be performed on a frame basis in the parallel processing process. No frame memory therefore needs to be used in the frame separation process for cost reduction. Further, the video processing in the video processing method can be readily performed because the video processing includes no complicated processing.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below in detail with reference to the drawings.

In the present embodiment, a description will be made of a case where a video processing apparatus 1 provided in a display apparatus performs video processing on a video signal formed of a plurality of frames by using two parallel processors 131 and 132. The display apparatus includes the video processing apparatus 1, which processes an inputted video signal, and a display section (not shown) that displays an image based on the video signal processed by the video processing apparatus 1. The display apparatus thus displays an image based on the inputted video signal.

Figure 1:
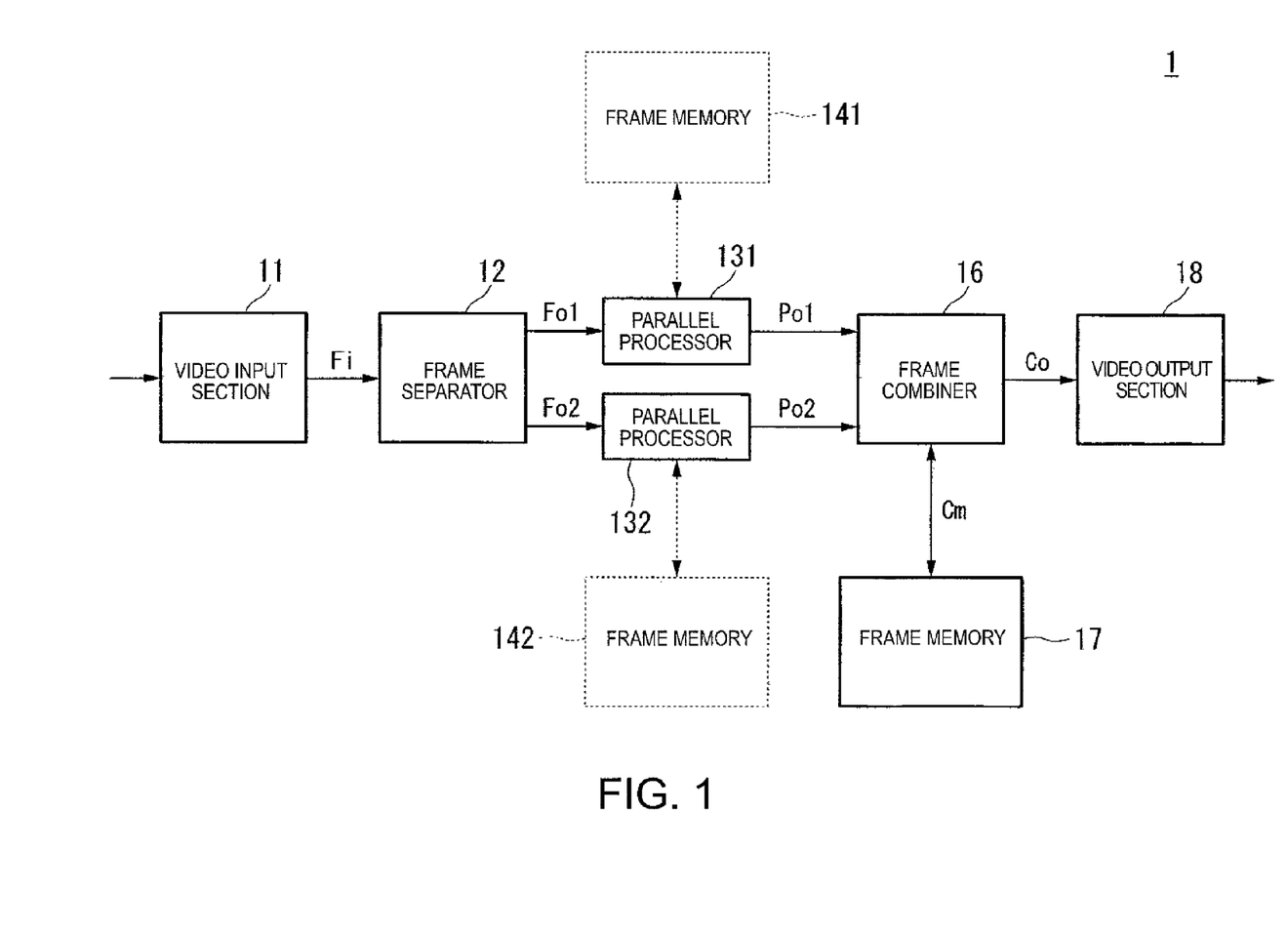
FIG. 1 is a schematic block diagram showing an example of the configuration of a video processing apparatus according to a first embodiment of the invention.

FIG. 1 is a schematic block diagram showing an example of the configuration of the video processing apparatus 1 according to the first embodiment of the invention.

The video processing apparatus 1 includes a video input section 11, a frame separator 12, parallel processors 131 and 132, frame memories 141 and 142, a frame combiner 16, a frame memory 17, and a video output section 18. The video processing apparatus 1 has other functions of a typical video processing apparatus, but these other functions will not be illustrated or described.

The video input section 11 acquires a video signal. The video input section 11 outputs the acquired video signal Fi to the frame separator 12. The frame separator 12 separates the video signal Fi inputted from the video input section 11 on a frame basis and distributes the separated video signals to the parallel processors 131 and 132. The frame separator 12, for example, outputs video signals Fo1 produced by subtracting even-numbered-frame video signals from the video signal Fi, that is, odd-numbered-frame video signals to the parallel processor 131 and outputs video signals Fo2 produced by subtracting odd-numbered-frame video signals from the video signal Fi, that is, even-numbered-frame video signals to the parallel processor 132.

The parallel processors 131 and 132 (parallel processors 131 and 132 are hereinafter collectively referred to as parallel processor 13) perform video processing in parallel on the video signals corresponding to the plurality of frames inputted from the frame separator 12. The video processing includes filtering, such as noise removal, and scaling. The scaling means increasing the resolution of an input signal to produce a higher-resolution output signal. For example, to produce a video signal of 4K2K or any other high resolution, for example, from a full-high-vision video signal (resolution of 1920×1080 pixels), the scaling includes interpolating missing pixels in an input signal to produce an output signal of higher resolution than the input signal. In this process, the parallel processors 131 and 132 may temporarily store the video signals Fo1 and Fo2 corresponding to the plurality of frames in the frame memories 141 and 142, read the video signals Fo1 and Fo2 from the frame memories 141 and 142 whenever the video processing is performed, and perform the video processing on the read video signals. The parallel processors 131 and 132 may instead include no frame memories 141 and 142 for the video processing.

The parallel processor 13 outputs odd-numbered-frame video signals Po1 and even-numbered-frame video signals Po2 having undergone the video processing to the frame combiner 16.

When the odd-numbered-frame video signals Po1 and the even-numbered-frame video signals Po2 are inputted from the parallel processor 13, the frame combiner 16 stores video signals Cm corresponding to the frames in predetermined memory areas of the frame memory 17 sequentially in the order of the video signals inputted from the parallel processor 13. The frame combiner 16 reads the video signals corresponding to the frames stored in the frame memory 17 sequentially in the input order and outputs the read video signals as video signals Co to the video output section 18.

The video output section 18 outputs the video signals Co corresponding to the frames inputted from the frame combiner 16 in the form of video images having undergone the video processing.

Figure 2:
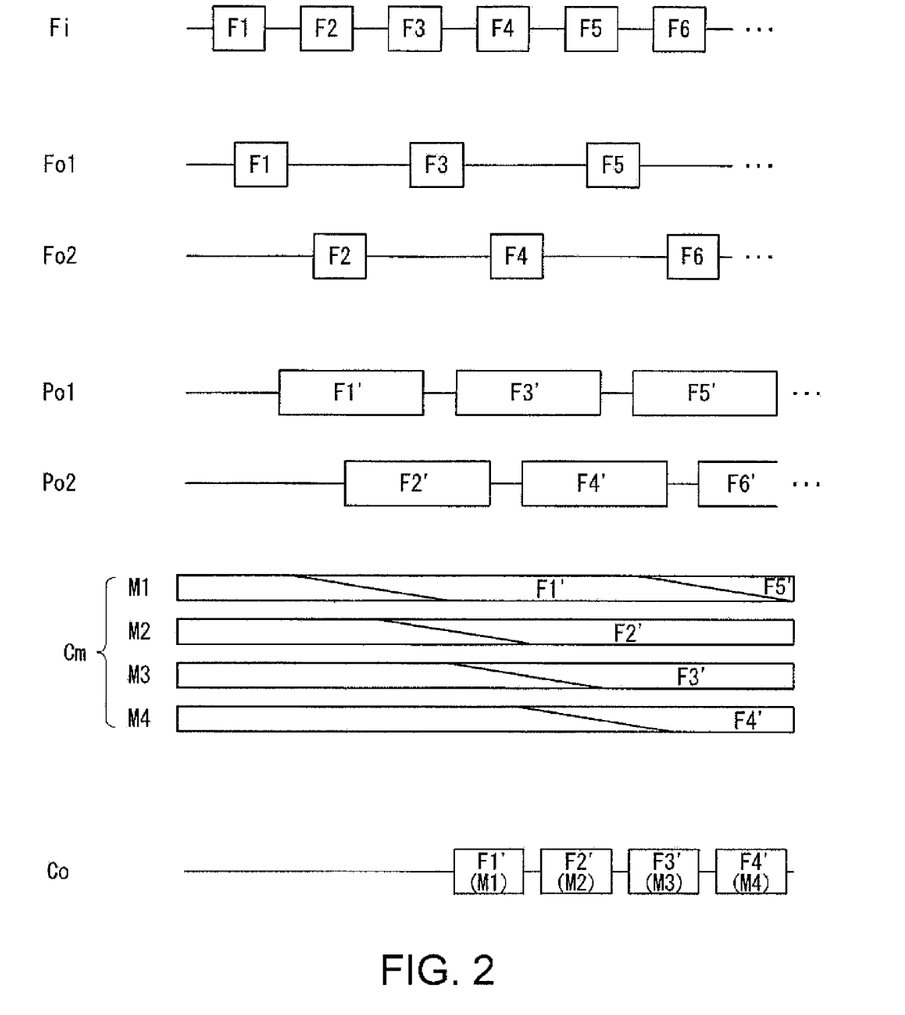
FIG. 2 is a timing chart showing an example of the relationship between input video images and output video images in the video processing apparatus according to the present embodiment.

FIG. 2 is a timing chart showing an example of the relationship between input video images and output video images in the video processing apparatus 1 according to the present embodiment.

The timing chart shown in FIG. 2 shows the relationship among the video signal Fi, which is inputted from the video input section 11 to the frame separator 12, the video signals Fo1 and Fo2, which the frame separator 12 outputs to the parallel processors 131 and 132 respectively, the video signals Po1 and Po2, which have undergone the video processing performed by the parallel processors 131 and 132 and have been outputted therefrom to the frame combiner 16, the video signals Cm, which the frame combiner 16 stores in predetermined storage areas M1, M2, M3, and M4 of the frame memory 17, and the video signals Co, which the frame combiner 16 outputs to the video output section 18.

The frame separator 12 separates frames F1, F2, F3, F4, F5, which form the video signal Fi, into odd-numbered frames and even-numbered frames and outputs the odd-numbered frames F1, F3, as the video signals Fo1 to the parallel processor 131. Similarly, the frame separator 12 outputs the even-numbered frames F2, F4, among the frames F1, F2, F3, F4, F5, which form the video signal Fi, as the video signals Fo2 to the parallel processor 132.

The parallel processors 131 and 132 perform the video processing on the video signals Fo1 and Fo2 corresponding to the individual frames and outputs the processed video signals as the video signals Po1 and Po2 to the frame combiner 16. The frames F1, F2, F3, F4, F5, in the video signals Fo1 and Fo2 are changed in the video processing to frames F1', F2', F3', F4', F5', in the video signals Po1 and Po2.

Assuming now that the video signal Fi has a frame rate of 60 Hz, the video signals Po1 and Po2 corresponding to the individual frames, which have undergone the video processing performed by the parallel processors 131 and 132 and have been outputted therefrom, have a frame rate of 30 Hz. The parallel processor 13 therefore performs the video processing on the video signals corresponding to the individual frames over a video processing period twice longer than the frame cycle of the video signal Fi. The parallel processor 13 can thus perform high-level video processing on each of the frames.

The frame combiner 16 stores the video signals Po1 and Po2 corresponding to the individual frames inputted from the parallel processor 13 in the predetermined storage areas M1, M2, M3, M4, and other storage areas of the frame memory 17 sequentially in the order of the video signals inputted from the parallel processor 13. For example, when the video signals Po1 and Po2 corresponding to the individual frames are inputted from the parallel processor 13, the frame combiner 16 stores the video signals as the video signals Cm in the predetermined storage areas M1, M2, M3, and M4 of the frame memory 17 sequentially in the order of the frame F1', the frame F2', the frame F3', and the frame F4' inputted from the parallel processor 13.

The frame combiner 16 reads the video signals from the frame memory 17 sequentially in the order in which the video signals have been stored in the frame memory 17 so that the order of the read frames is the same as the order of the frames in the video signal acquired by the video input section 11, and the frame combiner 16 outputs the read video signals as the video signals Co to the video output section 18. That is, the frame combiner 16 outputs the video signals Co corresponding to the individual frames in the following order to combine the video signals Co: the frame F1' corresponding to the frame F1; the frame F2' corresponding to the frame F2; the frame F3' corresponding to the frame F3; and the frame F4' corresponding to the frame F4. The display section of the display apparatus displays images based on the video signals Co outputted from the video output section 18.

In the present embodiment, the frame separator 12 separates an input video signal formed of a plurality of frames into odd-numbered-frame video signals produced by subtracting even-numbered-frame video signals from the inputted video signal and even-numbered-frame video signals produced by subtracting odd-numbered-frame video signals from the input video signal. The frame separator 12 may alternatively output video data formed of a plurality of frames directly but after subtraction of sync signals to the parallel processor 13. A process carried out by the frame separator 12 in this case will be described in detail with reference to FIG. 3.

Figure 3:
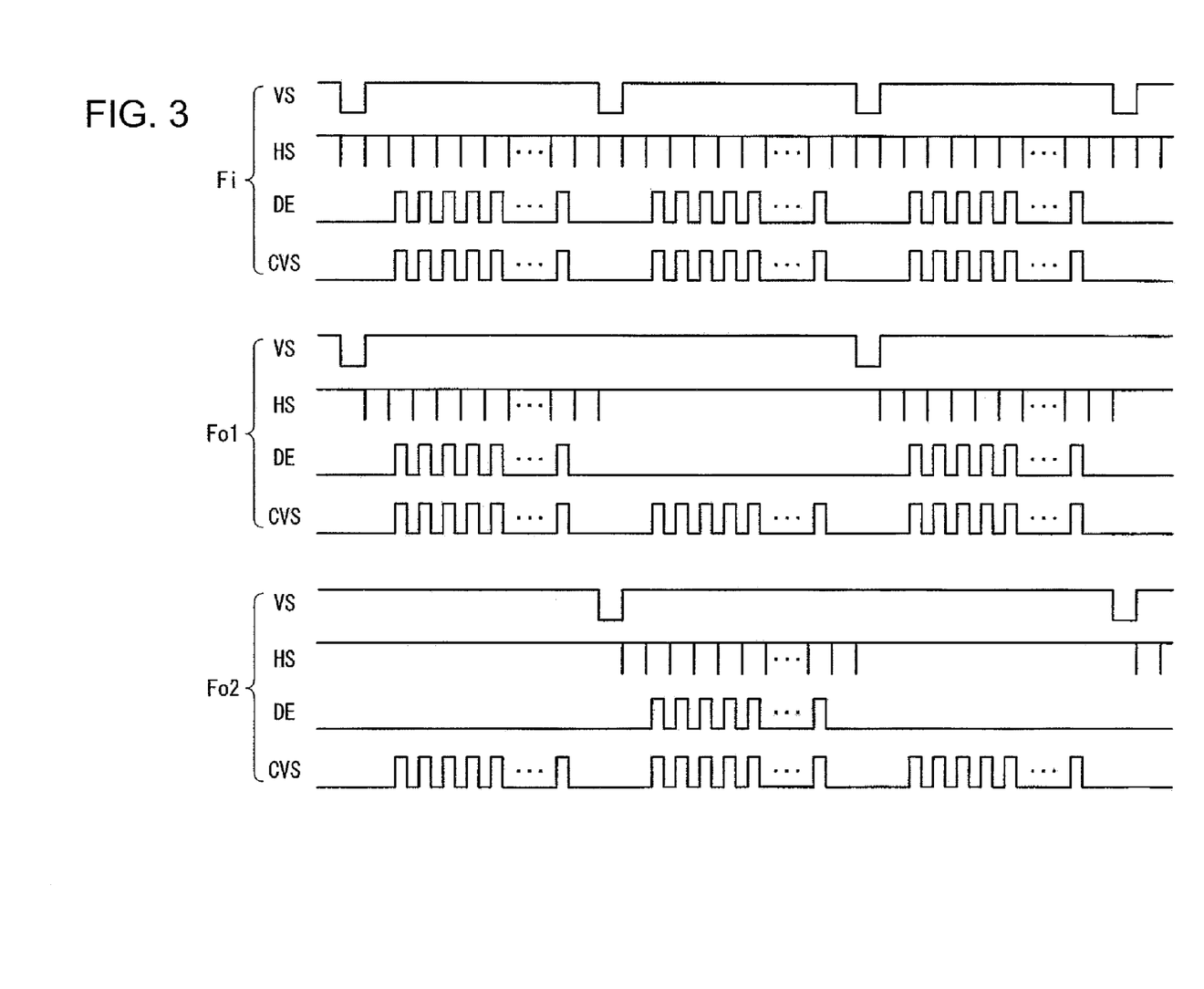
FIG. 3 is a timing chart showing an example of the relationship between input sync signals and output sync signals in a frame separator of the video processing apparatus according to the present embodiment.

FIG. 3 is a timing chart showing an example of the relationship between input sync signals and output sync signals in the frame separator 12 of the video processing apparatus 1 according to the present embodiment.

Sync signals inputted to and outputted from the frame separator 12 are, for example, vertical sync signals VS, horizontal sync signals HS, and enable signals DE. Further, video data inputted to the frame separator 12 is video data CVS, which is the same video data outputted to the parallel processor 13.

The video signal Fi inputted to the frame separator 12 contains the sync signals and the video data CVS. The sync signals are the vertical sync signals VS, which continue in the frame cycle, the horizontal sync signals HS, which continue at predetermined intervals, and the enable signals DE, each of which represents whether corresponding pixel data is valid or invalid. The frame separator 12 subtracts even-numbered vertical sync signals VS as well as horizontal sync signals HS and enable signals DE corresponding thereto from the video signal Fi to produce odd-numbered-frame sync signals and sets them to be sync signals in the video signals Fo1 outputted to the parallel processor 131. Similarly, the frame separator 12 subtracts odd-numbered vertical sync signals VS as well as horizontal sync signals HS and enable signals DE corresponding thereto from the video signal Fi to produce even-numbered-frame sync signals and sets them to be sync signals in the video signals Fo2 outputted to the parallel processor 132. The frame separator 12 outputs the video signals Fo1 and Fo2 containing the produced sync signals to the parallel processor 13. In this process, the video data CVS contained in the video signal Fi remains the same as that inputted to the frame separator 12 and is outputted to both the parallel processors 131 and 132.

The frame separator 12 may instead output the separated video signals corresponding to the plurality of frames alternately to the parallel processors 131 and 132 in a switching operation.

In this case, the frame separator 12 only needs to subtract video signals corresponding to sync signals or frames on which the parallel processors 131 and 132 perform the video processing and output the subtracted video signals, whereby no frame memory is required for cost reduction.

In the present embodiment, the video processing apparatus 1 includes the frame memories 141 and 142 in the above description, but the frame memories 141 and 142 may be omitted.

As described above, in related art, dividing a screen requires reading data corresponding to one frame from and writing the data to a frame memory at least in the period corresponding to the one frame by using a few gigabit-per-second bandwidth of the frame memory, whereas in the present embodiment, the frame separator 12 requires no frame memory, whereby the amount of frame memory access can be reduced and the cost can be lowered.

Variation of First Embodiment

A variation of the first embodiment of the invention will be described below in detail with reference to the drawings.

In the above embodiment, the description has been made of the case where the video processing apparatus 1 uses the two parallel processors 131 and 132. The video processing apparatus 1 may instead include three or more parallel processors. The present variation will be described with reference to a case where a video processing apparatus 1a includes four parallel processors.

Figure 4:
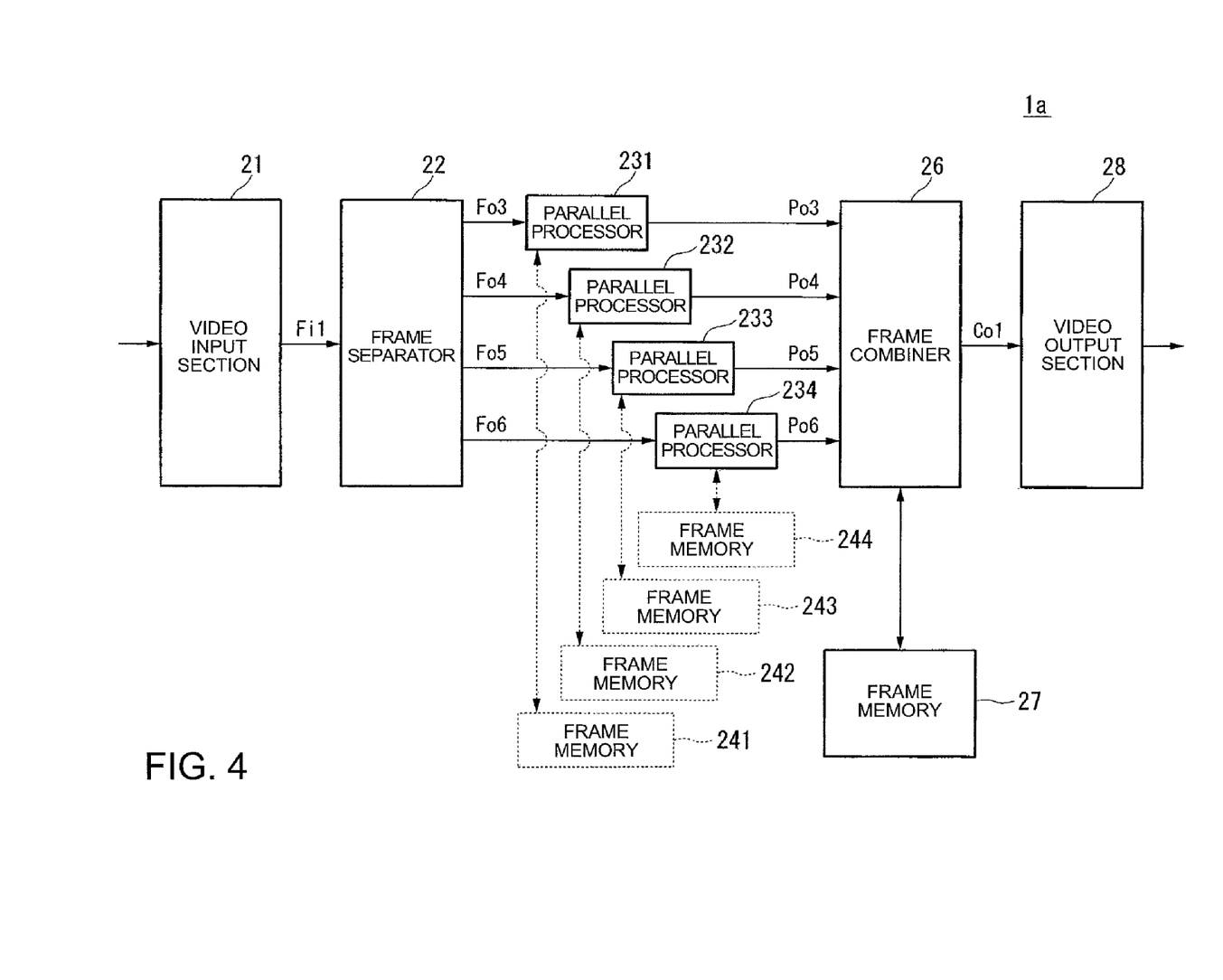
FIG. 4 is a schematic block diagram showing an example of the configuration of a video processing apparatus according to a variation of the present embodiment.

FIG. 4 is a schematic block diagram showing an example of the configuration of the video processing apparatus 1a according to the variation of the present embodiment.

The video processing apparatus 1a includes a video input section 21, a frame separator 22, parallel processors 231, 232, 233, and 234, frame memories 241, 242, 243, and 244, a frame combiner 26, a frame memory 27, and a video output section 28. The video processing apparatus 1a further has other functions of a typical video processing apparatus, but these other functions will not be illustrated or described.

Comparing the configuration of the video processing apparatus 1 in the first embodiment with the configuration of the video processing apparatus 1a according to the present variation shows that the two parallel processors 131 and 132 are replaced with the four parallel processors 231, 232, 233, and 234 and the two frame memories 141 and 142 are replaced with the four frame memories 241, 242, 243, and 244 accordingly. The other components remain the same and will therefore not be described.

The frame separator 22 separates a video signal Fi1 inputted from the video input section 21 on a frame basis and distributes the separated video signals to the four parallel processors 231, 232, 233, and 234. The frame separator 22 outputs video signals Fo3, Fo4, Fo5, and Fo6 corresponding to the plurality of separated frames to the parallel processors 231, 232, 233, and 234 respectively in a switching operation.

The frame combiner 26 stores video signals Po3, Po4, Po5, and Po6 inputted from the parallel processors 231, 232, 233, and 234 in predetermined memory areas of the frame memory 27 sequentially in the input order. The frame combiner 26 reads the video signals corresponding to the individual frames stored in the frame memory 27 sequentially in the order in which the parallel processors 231, 232, 233, and 234 have stored the video signals in the frame memory 27 and outputs the read video signals as video signals Co1 to the video output section 28.

Figure 5:
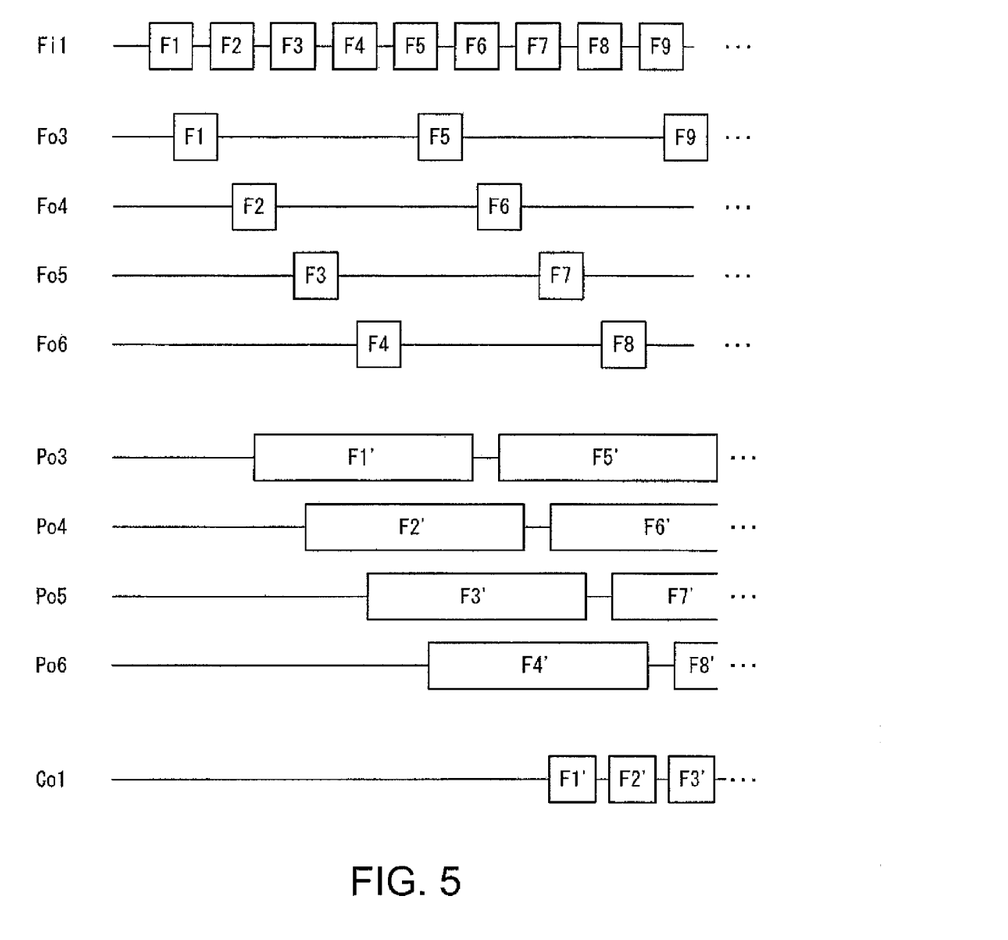
FIG. 5 is a timing chart showing an example of the relationship between input video images and output video images in the video processing apparatus according to the variation of the present embodiment.

FIG. 5 is a timing chart showing an example of the relationship between an input video signal and an output video signal in the video processing apparatus 1a according to the variation of the present embodiment.

The timing chart shown in FIG. 5 shows the relationship among the video signal Fi1, which the video input section 21 outputs to the frame separator 22, the video signals Fo3, Fo4, Fo5, and Fo6, which the frame separator 12 outputs to the parallel processors 231, 232, 233, and 234 respectively, the video signals Po3, Po4, Po5, and Po6, which have undergone the video processing performed by the parallel processors 231, 232, 233, and 234 and have been outputted therefrom to the frame combiner 26, and the video signals Co1, which the frame combiner 26 outputs to the video output section 28.

The frame separator 22 separates frames F1, F2, F3, . . . , F9, . . . , which form the video signal Fi1, from each other and outputs the separated video signals Fo3, Fo4, Fo5, and Fo6 corresponding to the frames F1, F2, . . . , F9 to the parallel processors 231, 232, 233, and 234 respectively in a switching operation. The parallel processors 231, 232, 233, and 234 perform the video processing on the video signals corresponding to the individual frames over a video processing period equal to the frame cycle of the video signals Fo3, Fo4, Fo5, and Fo6 corresponding to the individual frames multiplied by the number of parallel processors, that is, over a video processing period four times longer than the frame cycle.

The frame combiner 26 reads the video signals that the parallel processors 231, 232, 233, and 234 have stored in the frame memory 27 sequentially in an order that allows the order of the read frames to be the same as the order of the frames in the video signal acquired by the video input section 21 and outputs the read video signals as the video signals Co1 to the video output section 28. That is, the frame combiner combines the video signals Co1 corresponding to the individual frames by outputting the frames in the following order: the frame F1' corresponding to the frame F1; the frame F2' corresponding to the frame F2; and the frame F3' corresponding to the frame F3.

In the present variation, the video processing apparatus 1a includes the four parallel processors but may include N (N is an integer equal to 3 or equal to or greater than 5) parallel processors. In this case, the frame separator may sequentially output the separated video signals corresponding to the plurality of frames to the N parallel processors in a switching operation, and the parallel processors may perform the video processing on the video signals corresponding to the individual frames over a video processing period N times longer than the frame cycle of the video signals corresponding to the individual frames.

As described above, according to the present embodiment, the video processing apparatus 1 or 1a includes the video input section 11 or 21, which acquires a video signal formed of a plurality of frames, the frame separator 12 or 22, which separates the video signal acquired by the video input section 11 or 21 on a frame basis and distributes the separated video signals, the plurality of parallel processors 131 and 132 or 231, 232, 233, and 234, which perform the video processing in parallel on the video signals corresponding to the frames separated and distributed by the frame separator 12 or 22, and the frame combiner 16 or 26, which combines the video signals on which the plurality of parallel processors 131 and 132 or 231, 232, 233, and 234 have performed the video processing.

In the thus configured video processing apparatus 1 or 1a, the frame separator 12 or 22 can divide video images inputted to the video input section 11 or 21 into a plurality of frames that form the video images, and the plurality of parallel processors 131 and 132 or 231, 232, 233, and 234 can therefore perform the video processing on a frame basis. In this process, the frame separator 12 or 22 can separate the video images without using frame memories for cost reduction. Further, the video processing in the video processing apparatus 1 or 1a does not include complicated processing, such as removal of overlapping portions in an image combination process, because no overlapping areas are used in the parallel processing, whereby the image combination can be readily performed.

The frame separator 12 or 22 subtracts the sync signals associated with frames that do not undergo the video processing from a video signal and outputs the resultant video signals to the plurality of parallel processors 131 and 132 or 231, 232, 233, and 234.

The frame separator 12 or 22 can thus readily perform the frame separation because it only needs to process the sync signals and does not need to perform complicated processing, such as video data processing. Further, in the frame separation performed by the frame separator 12 or 22, no dedicated or high-bandwidth frame memory is required, whereby the cost can be lowered.

The frame separator 12 or 22 subtracts frames that do not undergo the video processing from a video signal and output the resultant video signals to the plurality of parallel processors 131 and 132 or 231, 232, 233, and 234.

The plurality of parallel processors 131 and 132 or 231, 232, 233, and 234 can therefore perform the video processing only on target frames, whereby the video processing can be readily performed without complicated processing. Further, since the frame separator 12 or 22 requires no frame memory, the cost can be lowered.

The frame separator 12 or 22 outputs separated video signals to the plurality of parallel processors 131 and 132 or 231, 232, 233, and 234 in a switching operation performed on a frame basis.

As a result, each of the plurality of parallel processors 131, 132, 231, 232, 233, and 234 can perform the video processing only on target frames, whereby the video processing can be readily performed without complicated processing. Further, since the frame separator 12 or 22 requires no frame memory, the cost can be lowered.

The video processing includes filtering on video images and scaling on the video images.

The video processing performed by each of the plurality of parallel processors 131, 132, 231, 232, 233, and 234, which includes filtering, such as noise removal, and scaling in which the resolution of an input signal is increased to produce a higher-resolution output signal, can be readily performed without complex processing.

Each of the parallel processors 131, 132, 231, 232, 233, and 234 performs the video processing on frames that undergo the video processing over a video processing period equal to the frame cycle of a video signal acquired by the video input section 11 or 21 multiplied by the number of parallel processors.

Therefore, even when each of the parallel processors 131, 132, 231, 232, 233, and 234 has low processing ability, the video processing can be performed at a high frequency frame rate. Further, each of the plurality of parallel processors 131, 132, 231, 232, 233, and 234 can maintain the frame rate even when performing the video processing over a period equal to the frame cycle of video images multiplied by the number of parallel processors.

The frame combiner 16 or 26 combines the video signals on which the plurality of parallel processors 131 and 132 or 231, 232, 233, and 234 have performed the video processing sequentially in the order in which the video signals are inputted.

The frame combiner 16 or 26 in the video processing apparatus 1 or 1a therefore combines a plurality of frames having undergone the video processing in the plurality of parallel processors 131 and 132 or 231, 232, 233, and 234 in the same order as that of the plurality of frames before the video processing, whereby the frames can be readily combined with each other without complicated processing.

Second Embodiment

A second embodiment of the invention will be described below in detail with reference to the drawings.

In the present embodiment, a description will be made of a case where latencies in the parallel processors differ from each other.

Figure 6:
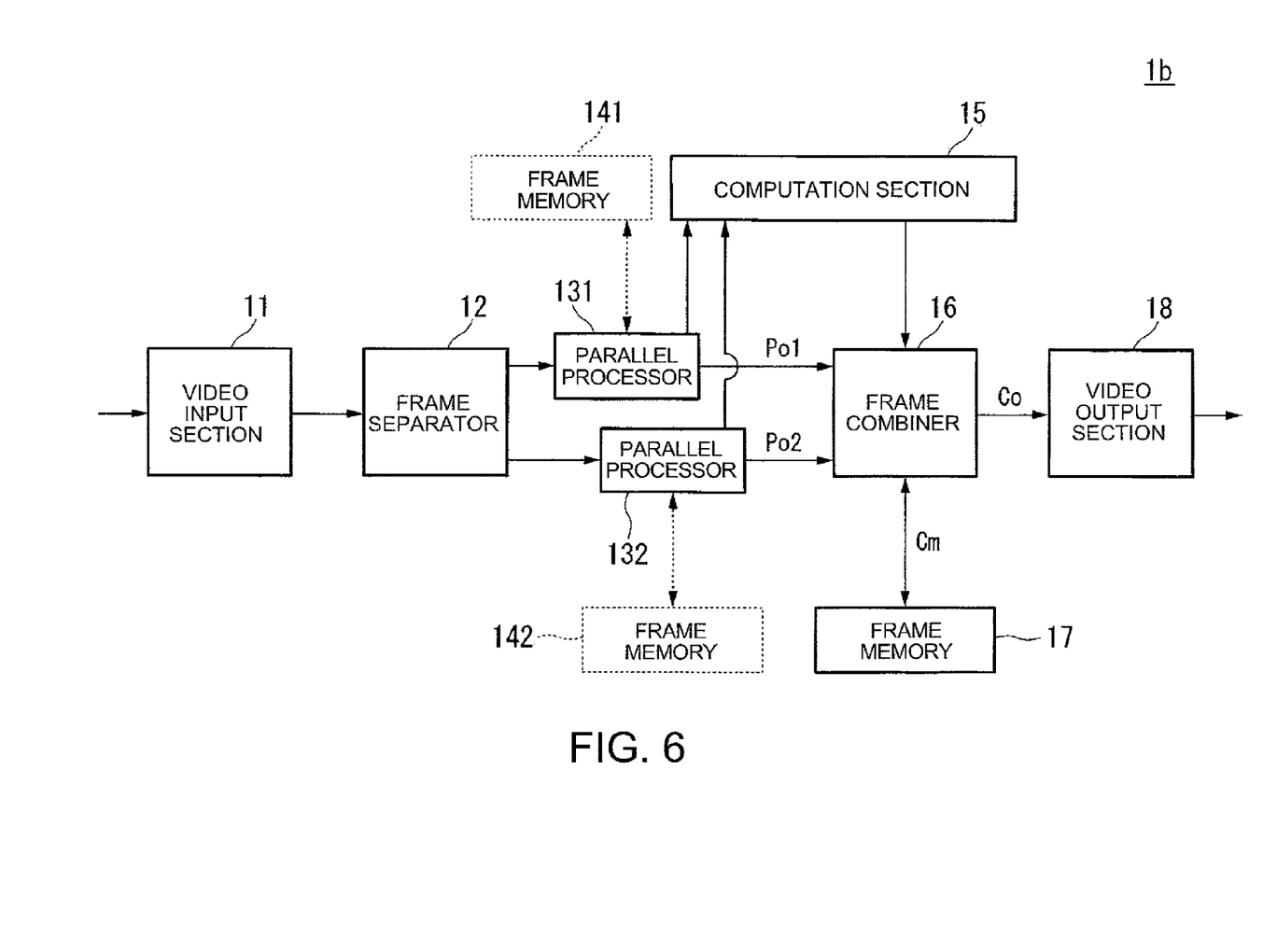
FIG. 6 is a schematic block diagram showing an example of the configuration of a video processing apparatus according to a second embodiment of the invention.

FIG. 6 is a schematic block diagram showing an example of the configuration of a video processing apparatus 1b according to the second embodiment of the invention.

The video processing apparatus 1b includes a video input section 11, a frame separator 12, parallel processors 131 and 132, frame memories 141 and 142, a computation section 15, a frame combiner 16, a frame memory 17, and a video output section 18. The video processing apparatus 1b further has other functions of a typical video processing apparatus, but these other functions will not be illustrated or described.

Comparing the configuration of the video processing apparatus 1 according to the first embodiment with the configuration of the video processing apparatus 1b according to the present embodiment shows that the computation section 15 is added. The other components remain the same and will therefore not be described.

When odd-numbered-frame video signals or even-numbered-frame video signals are inputted from the frame separator 12, the parallel processors 131 and 132 perform the video processing on the video signals corresponding to the individual frames. In this process, the parallel processors 131 and 132 obtain information on a latency in the video processing performed on each of the frames. The information on a latency is information containing the following two values: a delay of an output signal with respect to an input signal that occurs in the video processing performed by the parallel processors 131 and 132; and the time when the output signal is outputted. Each of the parallel processors 131 and 132 outputs the information on the measured latency to the computation section 15. The parallel processors 131 and 132 further output video signals Po1 and Po2 corresponding to the individual frames having undergone the video processing to the frame combiner 16.

When the information on the latency is inputted from each of the parallel processors 131 and 132, the computation section 15 calculates the difference between the delays, each of which represents the processing period spent for the video processing, based on the points of output time contained in the information on the latency to estimate the points of time when video signals corresponding to the individual frames are inputted to the parallel processors 131 and 132. The computation section 15 outputs the estimated points of time to the frame combiner 16.

When the video signals Po1 and Po2 corresponding to the individual frames are inputted from the parallel processors 131 and 132, the frame combiner 16 stores the video signals in predetermined storage areas of the frame memory 17 sequentially in the order of the inputted video signals corresponding to the individual frames. The frame combiner 16 refers to the points of time inputted from the computation section 15, reads the video signals corresponding to the individual frames from the predetermined storage areas of the frame memory 17 sequentially in the order of the points of time, and outputs the read video signals to the video output section 18.

As described above, the frame combiner 16 can estimate the order in which the video signals corresponding to the individual frames have been inputted to the parallel processors 131 and 132 by referring to the inputted points of time. The video images can therefore be correctly combined with each other even when the processing abilities of the parallel processors 131 and 132 differ from each other.

Figure 7:
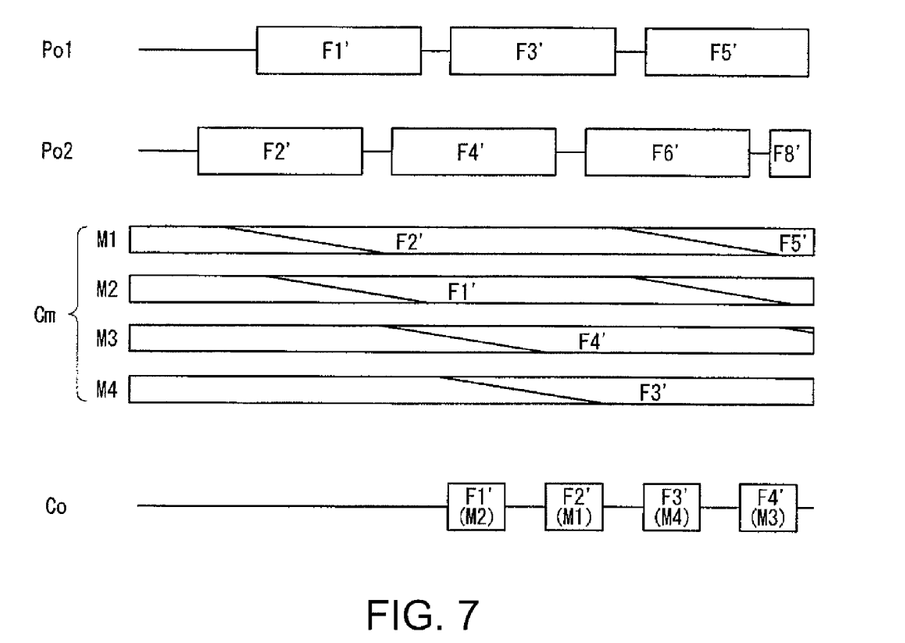
FIG. 7 is a timing chart showing an example of the relationship between input video images and output video images in the video processing apparatus according to the present embodiment.

FIG. 7 is a timing chart showing an example of the relationship between input video images and output video images in the video processing apparatus lb according to the present embodiment.

The odd-numbered-frame video signals Po1 outputted from the parallel processor 131 that performs the video processing on odd-numbered-frame video signals are formed of frames F1', F3', and F5', and the even-numbered-frame video signals Pot outputted from the parallel processor 132 that performs the video processing on even-numbered-frame video signals are formed of frames F2', F4', and F6'. In the video processing, when the parallel processor 131 produces a latency longer than the latency produced by the parallel processor 132 at least by a single frame, the frame F2' corresponding to the frame F2 is outputted before the frame F1' corresponding to the frame F1 still under the video processing. To handle the situation described above, each of the parallel processors 131 and 132 produces information on the latency.

The frame combiner 16 stores video signals Cm corresponding to the individual frames in predetermined storage areas M1, M2, M3, and M4 of the frame memory 17 sequentially in the order of the video signals corresponding to the individual frames inputted from the parallel processors 131 and 132. In the case shown in FIG. 7, the frame combiner 16 stores the video signals sequentially in the order of the frames F2', F1', F4', and F3' in the predetermined storage areas M1, M2, M3, and M4 of the frame memory 17. The frame combiner 16 reads the frames from the frame memory 17 based on the latency difference inputted from the computation section 15 in the following order: in the frame memory 17, the frame F1' from the predetermined storage area M2; then the frame F2' from the storage area Ml; then the frame F3' from the storage area M4; and then the frame F4' from the storage area M3, and outputs video signals Co corresponding to the individual frames to the video output section 18. That is, the frame combiner 16 changes the order of the video signals corresponding to the individual frames to be read from the frame memory 17 based on the latency difference.

The two parallel processors 131 and 132 are used in the present embodiment, but three or more parallel processors may be used for the video processing. In this case, the configuration of the variation according to the first embodiment may be used. Further, the frame memory 17 has four storage areas in the description, but a greater (smaller) number of storage areas may be provided and store video signals corresponding to the individual frames. As a result, even when the delay represented by the information on the latency is longer or equal to one frame, video signals corresponding to the individual frames having undergone the video processing can be outputted in the same order as that of the inputted video signals corresponding to the individual frames. The computation section 15 may be part of the frame combiner 16 or may be an external CPU (central processing unit) or any other external device. The parallel processors 131 and 132 may output points of time at which video signals corresponding to the individual frames are inputted thereto to the frame combiner 16. In this case, the computation section 15 can be omitted. The frame separator 12, which produces separated frames to be distributed to the parallel processors 131 and 132, may add information that allows identification of the order of the frames in place of the information on the latency to the frames and output the frames with the information to the parallel processors 131 and 132. In this case, the computation section 15 can be omitted.

As described above, according to the present embodiment, the video processing apparatus lb includes the video input section 11, which acquires a video signal formed of a plurality of frames, the frame separator 12, which separates the video signal acquired by the video input section 11 on a frame basis and distributes the separated video signals, the plurality of parallel processors 131 and 132, which perform the video processing in parallel on the video signals corresponding to the frames separated and distributed by the frame separator 12, and the frame combiner 16, which combines the video signals on which the plurality of parallel processors 131 and 132 have performed the video processing.

In the configuration described above, the frame separator 12 can separate video images without using frame memories for cost reduction. Further, the video processing in the video processing apparatus lb can be readily performed because the video processing includes no complicated processing.

Each of the plurality of parallel processors 131 and 132 outputs information on the latency produced in the video processing to the frame combiner 16. The frame combiner 16 combines video signals based on the information on the latency.

As a result, even when the processing abilities of the plurality of parallel processors 131 and 132 differ from each other, the frame combiner 16 can combine the frames having undergone the video processing in the plurality of parallel processors 131 and 132 sequentially in the order of the inputted video image frames.

Part or the entire of the video processing apparatus 1, 1*a*, and 1*b* in the embodiments described above may be achieved by a computer. In this case, a program for achieving the control function of the video processing apparatus may be stored on a computer readable recording medium, and the program stored on the recording medium may be read into a computer system and executed to achieve the control function.

The "computer system" used herein is assumed to be a computer system built in the video processing apparatus 1, 1*a*, or 1*b* and including an OS and a peripheral apparatus or any other type of hardware. Further, the "computer readable storage medium" used herein refers to a flexible disk, an magneto-optical disk, a ROM, a CD-ROM, and other portable media and a hard disk drive and other storage devices built in the computer system. Moreover, the "computer readable storage medium" also includes a medium that dynamically holds a program for a short period, such as a communication line in a case where the program is transmitted via the Internet or any other network or a telephone network line or any other communication network line and a medium that holds a program for a fixed period, such as a volatile memory in a computer system that serves as a server or a client in the above situation. Further, the program described above may be a program that achieves part of the function described above. Moreover, the function described above may be achieved by any of the programs described above combined with a program having already been recorded in the computer system.

Further, part or the entire of the video processing apparatus 1, 1*a*, or 1*b* in the embodiments described above may be achieved in the form of an integrated circuit based, for example, on LSI (large scale integration). Each of the functional blocks of the video processing apparatus 1, 1*a*, or 1*b* may be individually integrated in the form of a processor or part or the entire of the functional blocks may be implemented in the form of a processor. A method for integrating the components in the video processing apparatus in the form of an integrated circuit is not necessarily based on LSI but may be based on a dedicated circuit or a general-purpose processor. Further, when advances of semiconductor technologies allow advent of an integrated circuit technology that replaces LSI, an integrated circuit based on the technology may be used.

Embodiments of the invention have been described above in detail with reference to the drawings. The specific configurations are not limited to those described above, and a variety of design changes and other modifications can be made thereto to the extent that they do not depart from the substance of the invention.

What is claimed is:

1. A video processing apparatus comprising:
a video input section that acquires a video signal formed of a plurality of frames;
a frame separator that separates the video signal acquired by the video input section on a frame basis and distributes the separated video signals;
a plurality of parallel processors that perform video processing in parallel on the separated video signals corresponding to the frames separated and distributed by the frame separator; and
a frame combiner that combines the separated video signals on which the plurality of parallel processors have performed the video processing.

2. The video processing apparatus according to claim 1, wherein the frame separator subtracts sync signals corresponding to frames that do not undergo the video processing and outputs the resultant video signals to the plurality of parallel processors.

3. The video processing apparatus according to claim 1, wherein the frame separator subtracts frames that do not undergo the video processing and outputs the resultant video signals to the plurality of parallel processors.

4. The video processing apparatus according to claim 1, wherein the frame separator outputs the video signal to the plurality of parallel processors in a switching operation performed on a frame basis.

5. The video processing apparatus according to claim 1, wherein the video processing includes filtering performed on the video signal and scaling performed on the video signal.

6. The video processing apparatus according to claim 1, wherein each of the plurality of parallel processors performs the video processing on frames that undergo the video processing over a video processing period equal to a frame cycle of the video signal acquired by the video input section multiplied by the number of parallel processors.

7. The video processing apparatus according to claim 1, wherein the frame combiner combines the video signals on which the plurality of parallel processors have performed the video processing sequentially in the order in which the video signals have been inputted.

8. The video processing apparatus according to claim 1, wherein each of the plurality of parallel processors outputs information on a latency in the video processing to the frame combiner, and
the frame combiner combines the video signals based on the information on a latency.

9. A display apparatus comprising:
a video input section that acquires a video signal;
a frame separator that separates the video signal acquired by the video input section on a frame basis and distributes the separated video signals;
a plurality of parallel processors that perform video processing in parallel on the separated video signals corresponding to the frames separated and distributed by the frame separator; and
a frame combiner that combines the separated video signals on which the plurality of parallel processors have performed the video processing.

10. A video processing method comprising:
a first process of causing a video input section to acquire a video signal;
a second process of separating the video signal acquired in the first process on a frame basis and distributing the separated video signals;
a third process of performing video processing in parallel on the separated video signals corresponding to the frames separated and distributed in the second process; and
a fourth process of combining the separated video signals on which the video processing has been performed in the third process.

* * * * *